No. 875,949.
PATENTED JAN. 7, 1908.
W. H. REED.
BICYCLE PACKAGE CARRIER.
APPLICATION FILED MAY 10, 1907.
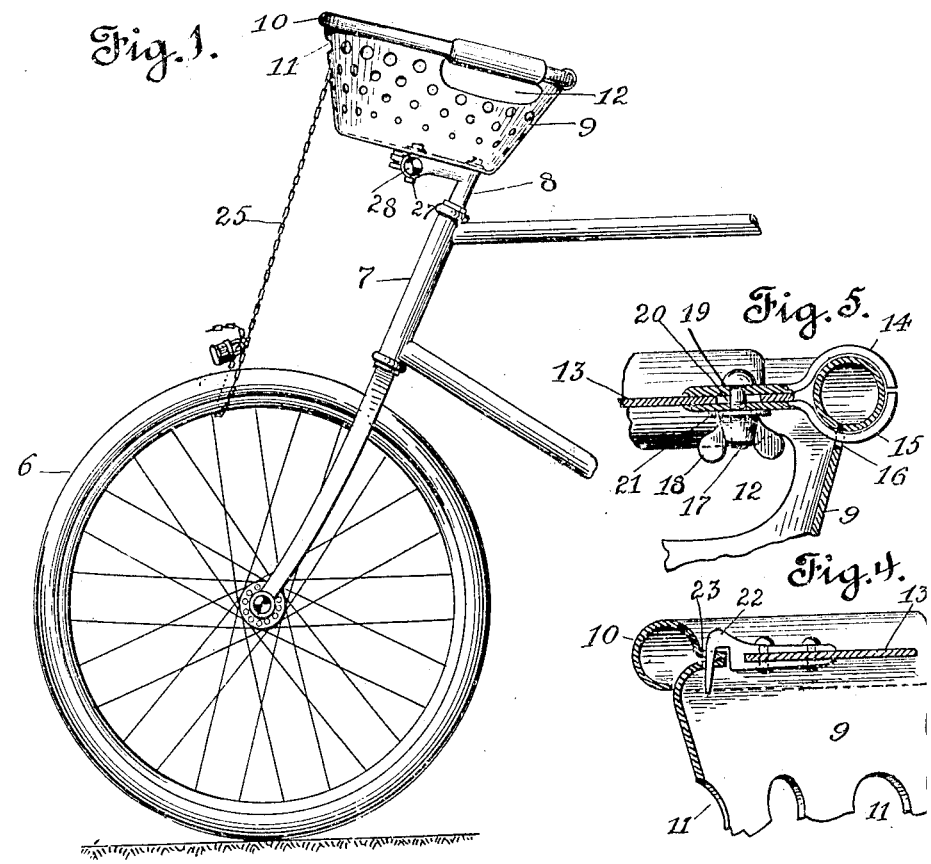
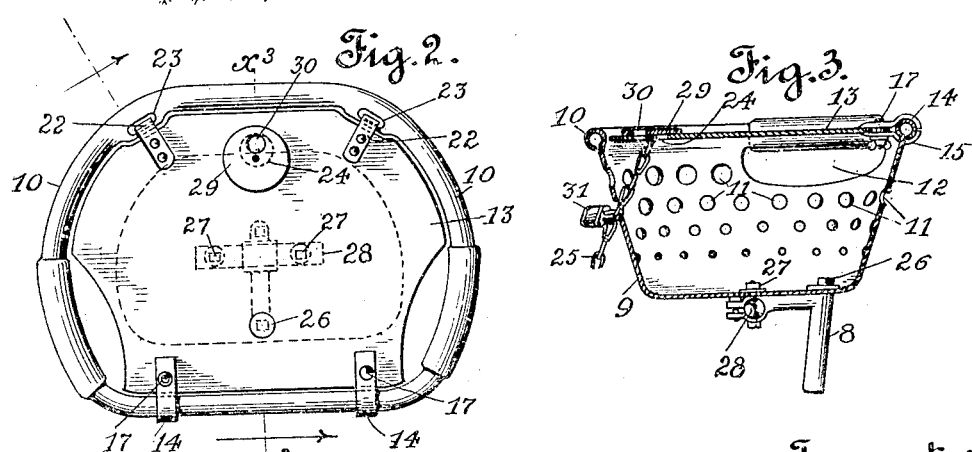
Witnesses
H. Monteverde.
S. B. Austin.
Inventor.
William H. Reed
by G. E. Copham
Attorney

UNITED STATES PATENT OFFICE.

WILLIAM H. REED, OF SAWTELLE, CALIFORNIA.

BICYCLE PACKAGE-CARRIER.

No. 875,949.    Specification of Letters Patent.    Patented Jan. 7, 1908.

Application filed May 10, 1907. Serial No. 372,852.

*To all whom it may concern:*

Be it known that I, WILLIAM H. REED, a citizen of the United States, residing at Sawtelle, county of Los Angeles, State of California, have invented new and useful Improvements in Bicycle Package-Carriers, of which the following is a specification.

My invention relates to a package carrier for bicycles and the object thereof is to provide a package carrier which can be so secured upon the bicycle that it can be used as a handle bar and to provide a cover therefor which when desired can be locked and if desired the front wheel of the bicycle can also be locked by the same locking means. I accomplish this object by the device described herein and illustrated in the accompanying drawings.

Figure 1 is a side elevation of my improved package carrier in place on a bicycle with my locking device securing the cover on the carrier and locking the bicycle at the same time. Fig. 2 is a plan of the carrier with the manner of securing it on the bicycle shown in dotted lines. Fig. 3 is a section on the line $x^3-x^3$ of Fig. 2. Figs. 4 and 5 are details showing the manner in which the cover is secured to the body of the carrier.

In the drawings 6 is the front wheel of a bicycle and 7 is the front fork thereof.

8 is an L-shaped handle bar stem secured in the front fork in the ordinary manner in which is mounted the handle bar when the carrier 9 is disconnected from said stem.

The carrier is preferably composed of a pressed sheet metal body 9 the top of which is turned into the roll 10 to strengthen the top and to provide a neat finish therefor. In order to make the carrier light the body may be perforated by perforations 11 if desired thereby permitting the use of heavier sheet metal in the formation of the body. The carrier may be of any desired configuration but I prefer to have the rear side straight and to have the ends circular as shown in Fig. 2 as this shape is both ornamental and useful and the carrier when removed from the bicycle can be hung on the wall of a room thereby providing an ornamental receptacle for papers or other articles. At each end and just below the rolled edge are apertures 12 which permit of the insertion of the fingers therethrough so that the roll of the top of the body may be used as a handle bar for guiding the bicycle. The metal which is cut out may be turned over the roll to reinforce the same, being cut away only at the bottom and ends from the other material. A cover 13 is secured upon the top of the body by hinges which are composed of the top members 14 and the bottom members 15. The bottom members 15 pass through slots 16 in the body just below the roll at the top as best shown in Fig. 5. These members are secured on the cover by bolts 17 which have wing nuts 18 for convenience in securing the parts together and for adjusting the cover. These bolts pass through holes 19 in the members of the hinge and through elongated slots 20 in the cover, which slots provide means for adjusting the cover toward or from the front of the body. Between the nut and the lower member of the hinge is a washer 21 to receive the friction of the nut. At the front portion of the cover are securing hooks 22 which are preferably riveted to the cover. These hooks when the cover is in place pass through apertures 23 formed in the body of the carrier, the metal being pinched in at this point as best shown in Figs. 2 and 4. Near the front edge of the cover it is provided with a perforation 24 through which the locking chain 25 passes.

The carrier is secured upon the handle bar stem by the expander bolt 26 which secures the handle bar stem in the front fork, and bolts 27 which pass through the bottom of the body and a short bar 28 which is secured in the handle bar stem 10 in the usual manner in place of the handle bars when they are removed. These bolts and bar and stem are shown in dotted lines in Fig. 2 in plan, which shows that the carrier bottom is well supported. Chain 25 is secured to a metal disk 29 having an aperture 30 therein. When it is desired to lock the cover of the carrier, chain 25 would be passed downwardly through aperture 24 in the cover and then outwardly through one of the perforations 11 of the body, when padlock 31 would be inserted in the last link coming through the body of the carrier, which would securely lock the cover thereon. This same method of locking the cover on the body can likewise be used when the carrier is detached from the bicycle. When it is desired to lock the bicycle as well as the carrier cover after the chain is passed downwardly through the cover and out through a perforation through the side of the body it would be passed downwardly and around the rim of the wheel and then the end link would be passed through one of the other links and secured with a padlock, as shown in Fig. 1, thereby securing the wheel from being operated as well as locking the carrier. By putting the chain around the rim of the wheel and then passing it through aperture 30 in the disk and then passing the chain around a post and passing the end link through one of the other links and securing it with the padlock the bicycle can be locked to a post.

By this construction I have provided an ornamental package carrier provided with a cover which can be securely locked and at the same time the front wheel of the machine can be locked. I have also provided an ornamental receptacle which can be used as a wall pocket when not required for use on the bicycle. By making the body of the carrier of sheet metal and rolling the top I provide sufficient strength therein so that it can be used for guiding the wheel in the place of the ordinary handle bar, and have simplified and cheapened the construction of the bicycle package carrier patented to me March 12, 1907, No. 846,695, by dispensing with the frame work required for supporting the wire structure forming the body of the carrier.

Having described my invention what I claim is;

1. A package carrier for bicycles comprising a receptacle having the body thereof formed of sheet metal, the top of which is rolled to form a top rim; a cover for said carrier; and means to lock the front wheel of the bicycle and the cover upon the body.

2. A package carrier for bicycles comprising a receptacle having the body thereof formed of sheet metal, the top of which is rolled to form a top rim; a cover for said carrier; hinges secured upon the rim and adjustably secured to said cover and revoluble on the rim of the body.

3. A package carrier for bicycles comprising a receptacle having the body thereof formed of sheet metal the top of which is rolled to form a top rim, said body having apertures below the rim at the ends whereby the same may be gripped by the rider; a cover for said carrier; and means to lock said cover to the body.

4. A package carrier for bicycles comprising a receptacle having the body thereof formed of sheet metal, the top of which is rolled to form a top rim; said body having apertures below the rim at the ends whereby the same may be gripped by the rider, said body being provided with perforations in the upper portion thereof; a cover for said carrier having a perforation near the front thereof; hinges secured upon the rim and adjustably secured upon said cover, said hinges being revoluble on said rim, and a locking device for said cover comprising a chain having a disk secured on one end thereof, said disk having a perforation therein, and a padlock.

In witness that I claim the foregoing I have hereunto subscribed my name this 2nd day of May, 1907.

WILLIAM H. REED.

Witnesses:
G. E. HARPHAM,
S. B. AUSTIN.